Nov. 10, 1959 L. D. SOUBIER 2,911,673
APPARATUS FOR MOLDING CONTAINERS WITH RESTRICTED NECK OPENINGS
Filed Aug. 3, 1955 2 Sheets-Sheet 1

INVENTOR.
LEONARD D. SOUBIER
BY
Rule and Hoge
ATTORNEYS

Nov. 10, 1959     L. D. SOUBIER     2,911,673
APPARATUS FOR MOLDING CONTAINERS WITH RESTRICTED NECK OPENINGS
Filed Aug. 3, 1955     2 Sheets-Sheet 2

INVENTOR.
LEONARD D. SOUBIER
BY
Rule and Hoge.
ATTORNEYS

United States Patent Office 2,911,673
Patented Nov. 10, 1959

2,911,673

APPARATUS FOR MOLDING CONTAINERS WITH RESTRICTED NECK OPENINGS

Leonard D. Soubier, Toledo, Ohio, assignor to Owens-Illinois Glass Company, a corporation of Ohio Application August 3, 1955, Serial No. 526,184

1 Claim. (Cl. 18—5)

My invention relates to molded hollow articles or containers formed of plastic materials, and to novel methods and means for producing such articles. The invention provides a novel method of making containers with restricted neck openings to control the dispensing of liquids or other materials from such containers.

A specific embodiment of the invention comprises a method and apparatus for molding milk bottles with a transverse partition at or near the cream line and providing a restricted outlet to facilitate pouring off the cream which has risen and separated from the milk. The invention also provides other forms of containers adapted for specific purposes and which are adapted to be made by novel methods herein disclosed. These include forms for use in dispensing comminuted material as, for example, salt and pepper shakers. Other forms are illustrated and hereinafter described.

The invention provides means for molding a bottle or hollow article by a method which comprises bringing a neck mold into register with an annular outlet opening of an extrusion die, forcing plastic material through said outlet into the neck mold and thereby molding the neck of the article by injection, thereafter withdrawing the neck mold and molded neck as a unit away from the said outlet and concurrently extruding plastic material from the outlet to form a tubular body blank in the open, while air under pressure is supplied through the neck mold to prevent collapse of the body blank. The blank is then severed at the outlet of the extrusion die, enclosed in a finishing mold and the article blown to finished form.

Referring to the accompanying drawings.

Figure 7:
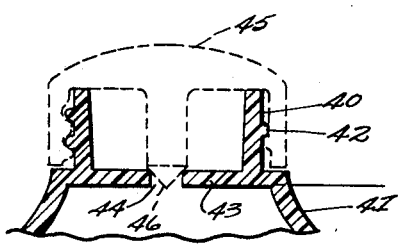
Figure 9:
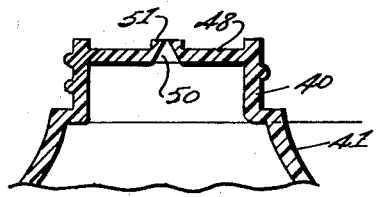
Figure 8:
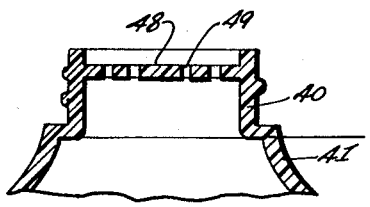

Figs. 7, 8, and 9 illustrate various modifications;

Fig. 7 shows a screw-type container neck to receive a screw cap designed for sealing the restricted neck opening;

Fig. 9 shows a screw-type neck with a different form of restricting diaphragm; and Fig. 8 illustrates a form for use in dispensing comminuted or powdered material.

Referring to Figs. 1–6, I have illustrated a method of molding a container particularly designed for use as a milk bottle. The bottle may consist of a plastic material either of the thermoplastic or thermosetting type, molded at a temperature at which the material is soft and plastic, said material setting or hardening as it cools. The molding material 10 (Fig. 2) is fed through a channel 11 into an extrusion die or head 12. The channel 11 communicates with a cylindrical opening 13 extending vertically through the head 12. A mandrel 14 extends through the opening 13, concentrically therewith, the mandrel and die opening 13 preferably being circular in cross section. A sleeve 15 surrounding the mandrel is moveable up and down thereon, the sleeve extending upwardly into the tubular passageway provided between the mandrel and the surrounding wall of the opening 13.

A partible neck mold 18 comprises separable sections or halves mounted in arms 19 for opening and closing the mold. A neck mold plunger 21 is formed with a molding head 22 for molding the inner surface of the neck portion of the bottle. The bottle neck includes a lower restricted neck portion 23 above which the neck is flared to form a cup-shaped portion 23$^a$. The plunger 21 is formed with an annular bead 24 for molding an annular recess 25 (Fig. 6) in the rim of the bottle neck. Such recess may be of conventional form for receiving the usual disk closure.

Figure 1:
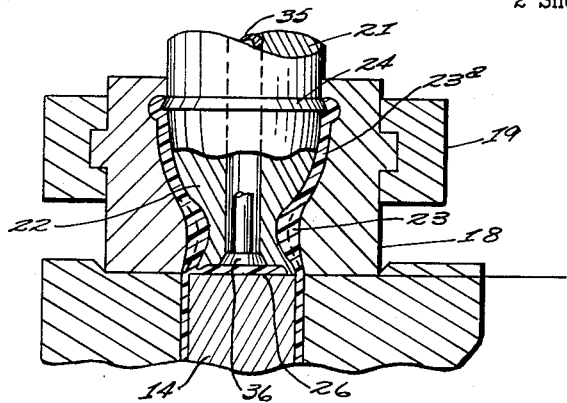
Fig. 1 is a sectional elevation with parts broken away, showing a molded bottle neck within a neck mold seated on an extrusion die.
Figures 2, 3:
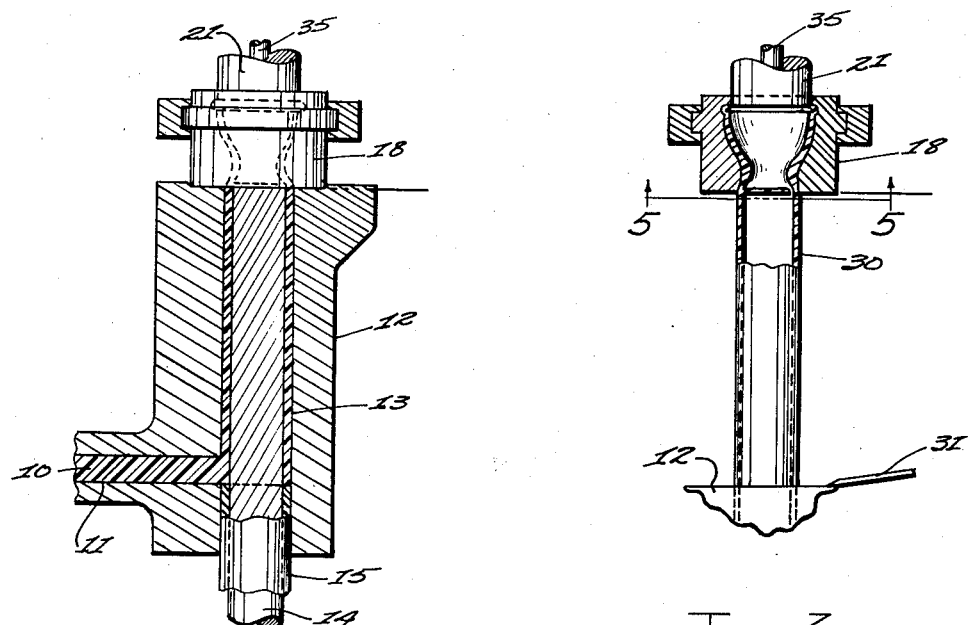
Fig. 2 is a sectional elevation showing the extrusion die and the neck mold prior to the molding of the bottle neck.
Fig. 3 is a part sectional view of the neck mold and the extruded body blank before severance from the extruder.
Figure 4:
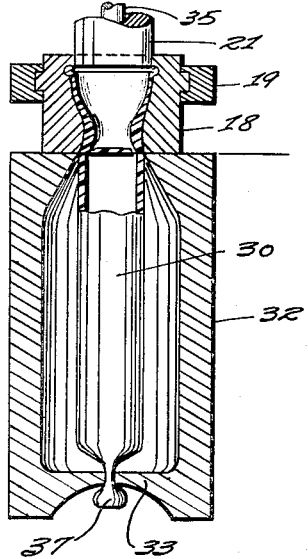
Fig. 4 is a sectional elevation showing the finishing body mold closed around the body blank.
Figure 5:
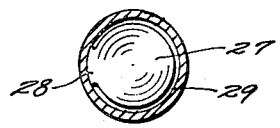
Fig. 5 is a cross section at the line 5—5 on Fig. 3 showing a disk or diaphragm molded integrally with the blank and restricting the neck opening.
Figure 6:
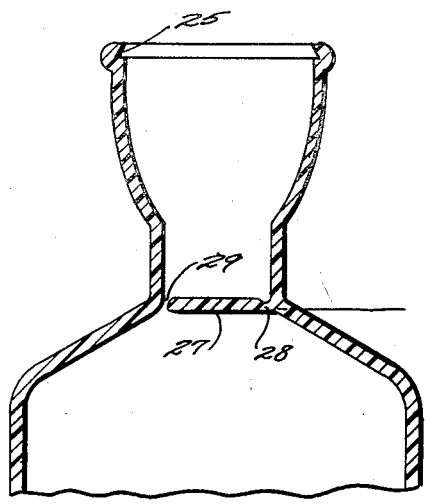
Fig. 6 is a sectional elevation of the finished bottle, parts being broken away.

In molding the bottle the neck mold is seated on the extrusion die head 12 as shown in Figs. 1 and 2, the cylindrical passageway 13 being at this time filled with the plastic material and the sleeve 15 in its lowered position with the channel 11 open. The sleeve 15 is now moved upwardly, thereby operating as a valve to close the channel 11 and at the same time forcing the plastic material upwardly into the neck mold, thus forming the neck portion of the bottle by injection molding. The head 22 of the plunger 21 is at this time seated on the flat top surface 26 of the mandrel 14 and is formed with a disk-shaped recess into which the plastic material enters and is molded in the form of a disk 27. The disk is integrally united with the wall of the bottle by a neck portion 28. The disk 27 is preferably concentric with the bottle neck and of slightly smaller diameter than the surrounding neck wall to provide a restricted annular or arc-shaped passageway 29. The disk forms a partition wall or diaphragm between the body and neck portions of the bottle. The connecting web 28 may serve as a hinge to permit the disk 27 to yield downwardly, for example, when the bottle is being filled. The resiliency of the material causes the disk automatically to return to its normal position. When the bottle is used as a milk bottle the disk 27 serves as a means to facilitate the pouring off of the cream which rises into the neck portion of the bottle. The elasticity of the plastic bottle permits the neck to be squeezed and contracted at the partition 27 in a manner to substantially shut off the neck portion from the body of the bottle, thus permitting the cream to be readily poured off without any substantial mixing therewith of the milk from which the cream has separated.

After the neck of the container has been formed by the upward movement of the sleeve 15 as above described, the sleeve is withdrawn downward to open the channel 11. The neck mold 18, plunger 21 and molded bottle neck are then moved as a unit vertically upward relative to the die head 12 while additional molding material is forced through the channel 11 and extruded through the annular orifice at the upper end of the head 12. This forms a tubular body blank 30 integral with the molded neck. The blank is then severed from the die head 12 by a cutter blade 31 which shears across the upper surface of the head 12 (Fig. 3). A finishing mold 32 (Fig. 4) is then closed around the body blank 30. The bottom sections of the mold 32 are shaped to pinch and close the lower end portion of the body blank 30.

The blank 30 is expanded to its finished form within the mold 32 by air pressure supplied through a pressure line comprising a pipe 35 extending downward through the plunger 21. The lower end of this pipe is closed by a valve 36. Air pressure is also supplied through the pipe 35 during the molding of the body blank 30 to prevent collapsing and to maintain the blank in cylindrical form during its extrusion from the die head 12. After the blank has been blown in the finishing mold the molds are open and the plunger 21 withdrawn. The flash 37 (Fig. 4) formed by the closing of the body mold is removed in any conventional or approved manner.

Fig. 7 illustrates a modified form of container comprising a cylindrical neck 40 and a shoulder portion 41. The neck is formed with an external screw thread 42. A diaphragm or partition 43 between the neck 40 and the shoulder 41, is formed with a central outlet opening 44 through which the contents of the container may be dispensed. A screw-threaded cap 45 forms a closure for the container. The cap may be formed with a plug 46 to seat on the diaphragm 43 and close the opening 44. If desired the cap may be adjusted upwardly to provide a greater or less restriction of the opening 44.

Fig. 8 illustrates a modification in which the diaphragm 48 is integrally molded with the neck 40 and positioned adjacent to the upper end of the neck. This diaphragm is formed with perforations 49 extending therethrough and which may be distributed in any desired manner. The container may thus serve as a salt or pepper shaker or for dispensing any desired material in powdered or comminuted form.

Fig. 9 illustrates a modified construction substantially like that shown in Fig. 8 except that the diaphragm 48 is formed with a single central outlet opening 50. The opening 50 extends through a raised portion or boss 51 on which the closure cap may seat for sealing the opening.

The method of molding the modified forms of containers, Figs. 7, 8, and 9, is substantially the same as above described for molding the milk bottle (Figs. 1–6), the shape of the molding surfaces of the neck mold, plunger and mandrel being modified to conform to the modified form of the container being molded thereby.

A resume of the operation is as follows: The neck mold 18 is closed and seated on the extrusion die head 12 as shown in Fig. 2. The sleeve 15 is then moved upwardly, thereby closing the channel 11 and forcing the plastic material into the neck mold to form the neck of the bottle, this step being an injection molding operation. The sleeve 15 is then withdrawn downward to open the channel 11. The neck mold with the molded bottle neck therein is then drawn upwardly away from the die head 12 and plastic material simultaneously extruded through the die head to form the body blank 30, the blank being maintained in tubular form by air under pressure supplied downwardly through the pipe 35. The shear 31 next severs the blank at the mouth of the die. The finishing mold 32 (Fig. 4) is then closed around the blank, pinching and closing the lower end of the blank. Air pressure through the pipe 35 then expands the body blank to finished form in the mold 32. The neck mold is then opened, the plunger 21 withdrawn or stripped from the molded neck and the body mold opened.

Modifications may be resorted to within the spirit and scope of my invention.

I claim:

In an apparatus for forming a plastic container having an injection molded neck joined to a blown body for communication therewith through a neck opening constricted by an injection molded diaphragm integral with the neck, said apparatus including an annular extrusion orifice surrounding an orifice core and means for expressing plastic material through said orifice, the improvements of a neck mold having an interior recess for communication with said orifice, a neck mold core disposed in said neck mold recess and having an end surface, one portion of which is aligned with and in contact with the orifice core when the neck mold recess communicates therewith, another portion of said neck mold core end surface being recessed to provide a diaphragm-defining space communicating with the neck mold recess above said orifice core to receive plastic material from said orifice as the neck mold is filled from said orifice.

References Cited in the file of this patent

UNITED STATES PATENTS

| | | |
|---|---|---|
| 2,239,092 | Gammill | Apr. 22, 1941 |
| 2,288,454 | Hobson | June 30, 1942 |
| 2,315,478 | Parkhurst | Mar. 30, 1943 |
| 2,443,053 | Parmelee | June 8, 1948 |
| 2,510,104 | Hartley | June 6, 1950 |
| 2,562,523 | Brunet | July 31, 1951 |
| 2,601,700 | Pinsky | July 1, 1952 |
| 2,710,987 | Sherman | June 21, 1955 |
| 2,715,751 | Weber | Aug. 23, 1955 |

FOREIGN PATENTS

| | | |
|---|---|---|
| 502,508 | Belgium | Apr. 30, 1951 |